United States Patent
Hashiguchi

(10) Patent No.: US 11,515,788 B2
(45) Date of Patent: Nov. 29, 2022

(54) SWITCHING CONTROL CIRCUIT

(71) Applicant: Rohm Co., Ltd., Kyoto (JP)

(72) Inventor: Shingo Hashiguchi, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 231 days.

(21) Appl. No.: 16/975,538

(22) PCT Filed: Jan. 28, 2019

(86) PCT No.: PCT/JP2019/002667
§ 371 (c)(1),
(2) Date: Aug. 25, 2020

(87) PCT Pub. No.: WO2019/181201
PCT Pub. Date: Sep. 26, 2019

(65) Prior Publication Data
US 2020/0403511 A1 Dec. 24, 2020

(30) Foreign Application Priority Data

Mar. 22, 2018 (JP) .............................. JP2018053840

(51) Int. Cl.
*H02M 3/158* (2006.01)
*B60L 53/20* (2019.01)
(Continued)

(52) U.S. Cl.
CPC ............. *H02M 3/158* (2013.01); *B60L 50/66* (2019.02); *B60L 53/20* (2019.02);
(Continued)

(58) Field of Classification Search
CPC .... H02M 1/0032; H02M 1/0035; H02M 1/08; H02M 1/088; H02M 1/36; H02M 1/44; H02M 3/156; H02M 3/158
See application file for complete search history.

(56) References Cited

U.S. PATENT DOCUMENTS 7,504,810 B1  3/2009 Tagare
7,755,342 B2*  7/2010 Chen ................... H02M 3/156
                                                    323/283

(Continued)

FOREIGN PATENT DOCUMENTS

JP  2003-219637  7/2003
JP  2007-104769  4/2007
(Continued)

OTHER PUBLICATIONS

Japan Patent Office, International Search Report for PCT/JP2019/002667 dated Mar. 12, 2019.

*Primary Examiner* — Matthew V Nguyen
(74) *Attorney, Agent, or Firm* — Fish & Richardson P.C.

(57) ABSTRACT

Provided is a switching control circuit used for a switching power supply device for generating an output voltage from an input voltage. The switching control circuit includes an intermittent operation mode for repeating an active period in which an output switching element of the switching power supply device is switched and an inactive period in which the output switching element is not switched. The switching control circuit is provided with a modulation unit for modulating a pulse frequency of a switching control signal during the active period, and performs control of switching of the output switching element by the switching control signal during the active period.

8 Claims, 7 Drawing Sheets

(51) Int. Cl.
  *B60L 50/60*   (2019.01)
  *H02M 1/08*    (2006.01)
  *H02M 1/00*    (2006.01)
  *H02M 1/44*    (2007.01)

(52) U.S. Cl.
  CPC .......... *H02M 1/0035* (2021.05); *H02M 1/08* (2013.01); *H02M 1/44* (2013.01)

(56) References Cited

U.S. PATENT DOCUMENTS

| | | | |
|---|---|---|---|
| 8,493,050 B2 * | 7/2013 | Miyamae | H02M 3/156 |
| | | | 323/298 |
| 9,541,928 B2 * | 1/2017 | Yamaguchi | H02M 1/36 |
| 2006/0197516 A1 | 9/2006 | Chiu et al. | |
| 2007/0145940 A1 | 6/2007 | Tsubota | |
| 2014/0265929 A1 * | 9/2014 | Gossehelweg | G05F 1/10 |
| | | | 315/307 |
| 2015/0194908 A1 * | 7/2015 | Wang | H02M 7/5395 |
| | | | 363/131 |
| 2016/0036322 A1 | 2/2016 | Miyamae | |
| 2017/0036554 A1 | 2/2017 | Kumazawa et al. | |
| 2017/0117805 A1 * | 4/2017 | Hane | H02M 3/158 |

FOREIGN PATENT DOCUMENTS

| | | | | |
|---|---|---|---|---|
| JP | 2012-100366 | | 5/2012 | |
| JP | 2013-038916 | | 2/2013 | |
| JP | 2014003810 | * | 1/2014 | ............ Y02T 10/92 |
| JP | 2014-204547 | | 10/2014 | |
| JP | 2015-122888 | | 7/2015 | |
| TW | 200633355 | | 9/2006 | |
| WO | WO-2012121205 A1 | * | 9/2012 | ............ H03K 17/51 |

\* cited by examiner

SWITCHING CONTROL CIRCUIT

TECHNICAL FIELD

This invention relates to a switching control circuit used in a switching power supply device.

BACKGROUND ART

There is a known technique of reducing the peak of the noise emitted from a switching power supply device by spectrum spreading of the switching frequency of the switching power supply device (see, for example, Patent Document 1).

There is also conventionally known a switching power supply device which improves efficiency in a light load condition by operating, in a regular condition (a non-light load condition), by PWM (pulse-width modulation) and, in a light load condition, by PFM (pulse-frequency modulation) (see, for example. Patent Document 2).

LIST OF CITATIONS

Patent Literature

Patent Document 1: JP-A-2012-100366
Patent Document 2: JP-A-2003-219637

SUMMARY OF THE INVENTION

Problem to be Solved by the Invention

In the switching power supply device disclosed in Patent Document 2, whether, in the switching control signal for PFM, a single pulse is skipped every predetermined cycle depending on the PFM reference clock is determined according to the output voltage of the switching power supply device. That is, the pulse frequency of the switching control signal for PFM is determined in accordance with the condition of the load. Thus, with the switching power supply device disclosed in Patent Document 2, it is not possible, in a light load condition, to reduce the peak of noise by spectrum spreading.

In view of the situation described above, this invention is aimed at providing a switching control circuit which can, in an intermittent operation mode, reduce the peak of the noise emitted from a switching power supply device.

Means for Solving the Problem

A switching control circuit according to one aspect of what is disclosed herein is one that is used in a switching power supply device for generating an output voltage from an input voltage and that is configured to have an intermittent operation mode in which an operation period during which switching of an output switching element in the switching power supply device is performed and a suspension period during which no switching of the output switching element is performed alternate. The switching control circuit includes a modulator configured to modulate the pulse frequency of a switching control signal during the operation period, and is configured to control the switching of the output switching element with the switching control signal during the operation period (a first configuration).

In the switching control circuit according to the first configuration described above, preferably, the modulator includes a counter and a D/A converter configured to perform digital-to-analog conversion on the output of the counter, and the modulator is configured to modulate the pulse frequency according to the output of the D/A converter (a second configuration).

In the switching control circuit according to the second configuration described above, preferably, the counter is an up-down counter (a third configuration).

In the switching control circuit according to the second or third configuration described above, preferably, no clock signal is fed to the counter during the suspension period (a fourth configuration).

In the switching control circuit according to the fourth configuration described above, preferably, the output of the D/A converter is kept at the ground potential during the suspension period (a fifth configuration).

In the switching control circuit according to any one of the first to fifth configurations described above, preferably, the number of pulses in the switching control signal during the operation period is a constant value equal to or larger than two (a sixth configuration).

In the switching control circuit according to any one of the first to fifth configurations described above, preferably, the number of pulses in the switching control signal during the operation period changes based on the output voltage (a seventh configuration).

In the switching control circuit according to any one of the first to seventh configurations described above, preferably, it is configured to further have a non-intermittent operation mode in which the output switching element keeps being switched, and is configured to control, with the switching control signal, the switching frequency of the output switching element such that the switching frequency remains at 1.8 MHz or higher but 2.1 MHz or lower during the non-intermittent operation mode tan eighth configuration).

According to another aspect of what is disclosed herein, a switching power supply device includes an output switching element and the switching control circuit according to any one of first to eighth configurations which controls the switching of the output switching element (a ninth configuration).

According to another aspect of what is disclosed herein, a vehicle includes the switching power supply device according to the ninth configuration described above and a battery for supplying the switching power supply device with electric power (a tenth configuration).

Advantageous Effects of the Invention

With a switching control circuit disclosed herein, it is possible, in an intermittent operation mode, to reduce the peak of the noise emitted from a switching power supply device.

DESCRIPTION OF EMBODIMENTS

<1. Example of an Overall Configuration of a Switching Power Supply Device>

Figure 1:
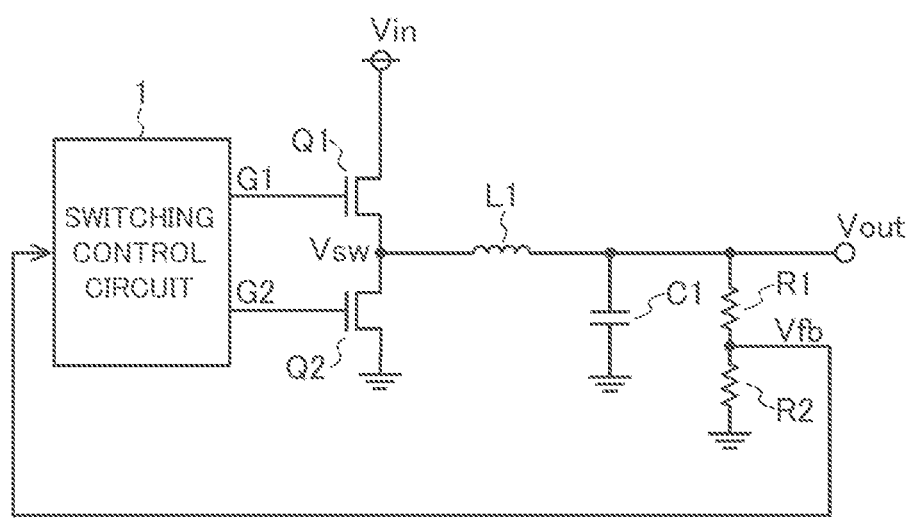
FIG. 1 A diagram showing an example of an overall configuration of a switching power supply device.

FIG. 1 is a diagram showing an example of an overall configuration of a switching power supply device. The switching power supply device shown in FIG. 1 is a bucking (step-down) switching regulator, and includes a switching control circuit 1, MOS transistors Q1 and Q2 as output switching elements, an inductor L1, an output capacitor C1, and voltage division resistors R1 and R2.

The MOS transistor Q1 is an N-channel MOS transistor, and is one example of a switch that switches, between electrically conducting and cut-off states, the path between an input terminal, through which an input voltage Vin is fed in, and one end of the inductor L1. The drain of the MOS transistor Q1 is connected to the input terminal, through which the input voltage Vin is fed in. The source of the MOS transistor Q1 is connected to one end of the inductor L1 and to the drain of the MOS transistor Q2.

The MOS transistor Q2 is an N-channel MOS transistor, and is one example of a switch that switches, between electrically conducting and cut-off states, the path between a ground potential and one end of the inductor L1. The drain of the MOS transistor Q2 is, as mentioned above, connected to one end of the inductor L1 and to the source of the MOS transistor Q1. The source of the MOS transistor Q2 is connected to the ground potential. A diode may be used instead of the MOS transistor Q2.

The other end of the inductor L1 is connected to one end of the output capacitor C1, to one end of the voltage division resistor R1, and to an output terminal, through which an output voltage Vout is fed out. The other end of the capacitor C1 is connected to the ground potential. The other end of the voltage division resistor R1 is connected to one end of the voltage division resistor R2, and the other end of the voltage division resistor R2 is connected to the ground potential.

The output capacitor C1 is a smoothing capacitor for reducing ripples in the output voltage Vout. The voltage division resistors R1 and R2 divide the output voltage Vout to generate a feedback voltage Vfb. and feed it to the switching control circuit 1.

The switching control circuit 1 generates a gate signal G1 for the MOS transistor Q1 and a gate signal G2 for the MOS transistor Q2 to complementarily turn on and off the MOS transistors Q1 and Q2 according to the feedback voltage Vfb, and feeds the gate signals G1 and G2 to the gates of the MOS transistors Q1 and Q2 respectively. It is preferable to secure, during the on/off transition of the MOS transistors Q1 and Q2, a dead time during which the MOS transistors Q1 and Q2 are both off.

<2. Example of the Configuration of the Switching Control Circuit>

Figure 2:
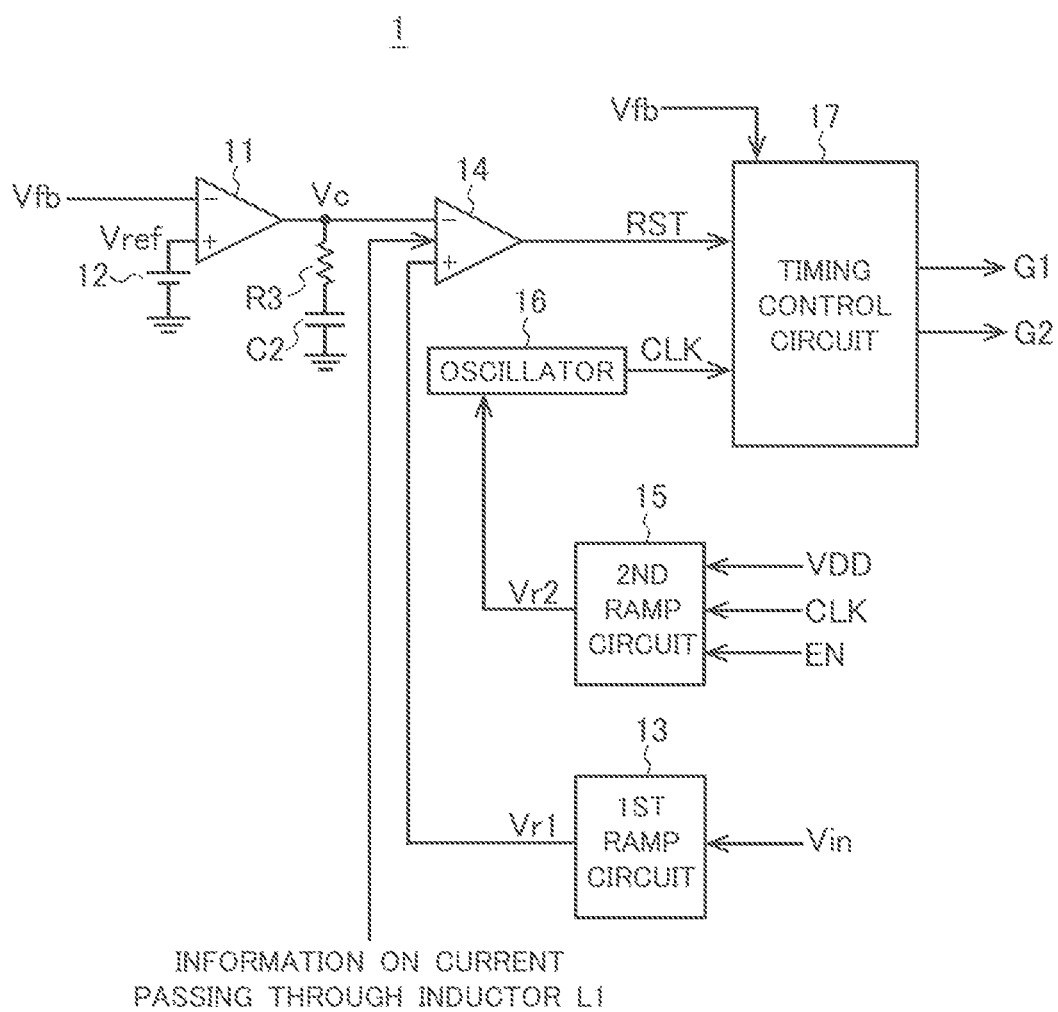
FIG. 2 A diagram showing one configuration example of a switching control circuit.

FIG. 2 is a diagram showing one configuration example of the switching control circuit 1. In the example shown in FIG. 2, the switching control circuit 1 includes an error amplifier 11, a reference voltage source 12, a resistor R3, a capacitor C2, a first ramp circuit 13, a comparator 14, a second ramp circuit 15, an oscillator 16, and a timing control circuit 17.

The error amplifier 11 generates an error signal Vc commensurate with the difference between the feedback voltage Vfb and a reference voltage Vref which is output from the reference voltage source 12. The error signal Vc is phase-compensated by a phase compensation circuit which is constituted by the resistor R3 and the capacitor C2.

The first ramp circuit 13 generates and outputs a first ramp voltage Vr1 with a gradient commensurate with the input voltage Vin. The first ramp voltage Vr1 is reset by a reset signal RST which is output, for example, from the comparator 14.

The comparator 14 compares the phase-compensated error signal Vc with the first ramp voltage Vr1 to generate the reset signal RST, which is a comparison signal.

The comparator 14 is configured such that it receives from a current sensor (unillustrated in FIG. 1) provided in the switching power supply device shown in FIG. 1 information on the current passing through the inductor L1, and gives an offset commensurate with the current passing through the inductor L1 to either the first ramp voltage Vr1 or the phase-compensated error signal Vc. So configured, the switching power supply device shown in FIG. 1 operates as a current mode control switching regulator. The comparator 14 may be configured such that the comparator 14 does not receive information on the current passing through the inductor L1. In this case, the switching power supply device shown in FIG. 1 operates as a voltage mode control switching regulator.

The second ramp circuit 15 generates and outputs a second ramp voltage Vr2 with a gradient commensurate with an internal supply voltage VDD. The internal supply voltage VDD is a constant voltage generated inside the switching control circuit 1 using the input voltage Vin. The second ramp circuit 15 modulates the offset of the second ramp voltage Vr2. The second ramp circuit 15 also resets the second ramp voltage Vr2 based on the output signal (a clock signal CLK) of the oscillator 16. Specifically, the second ramp circuit 15 resets the second ramp voltage Vr2 at the time point that the clock signal CLK switches from high level to low level.

Figure 3:
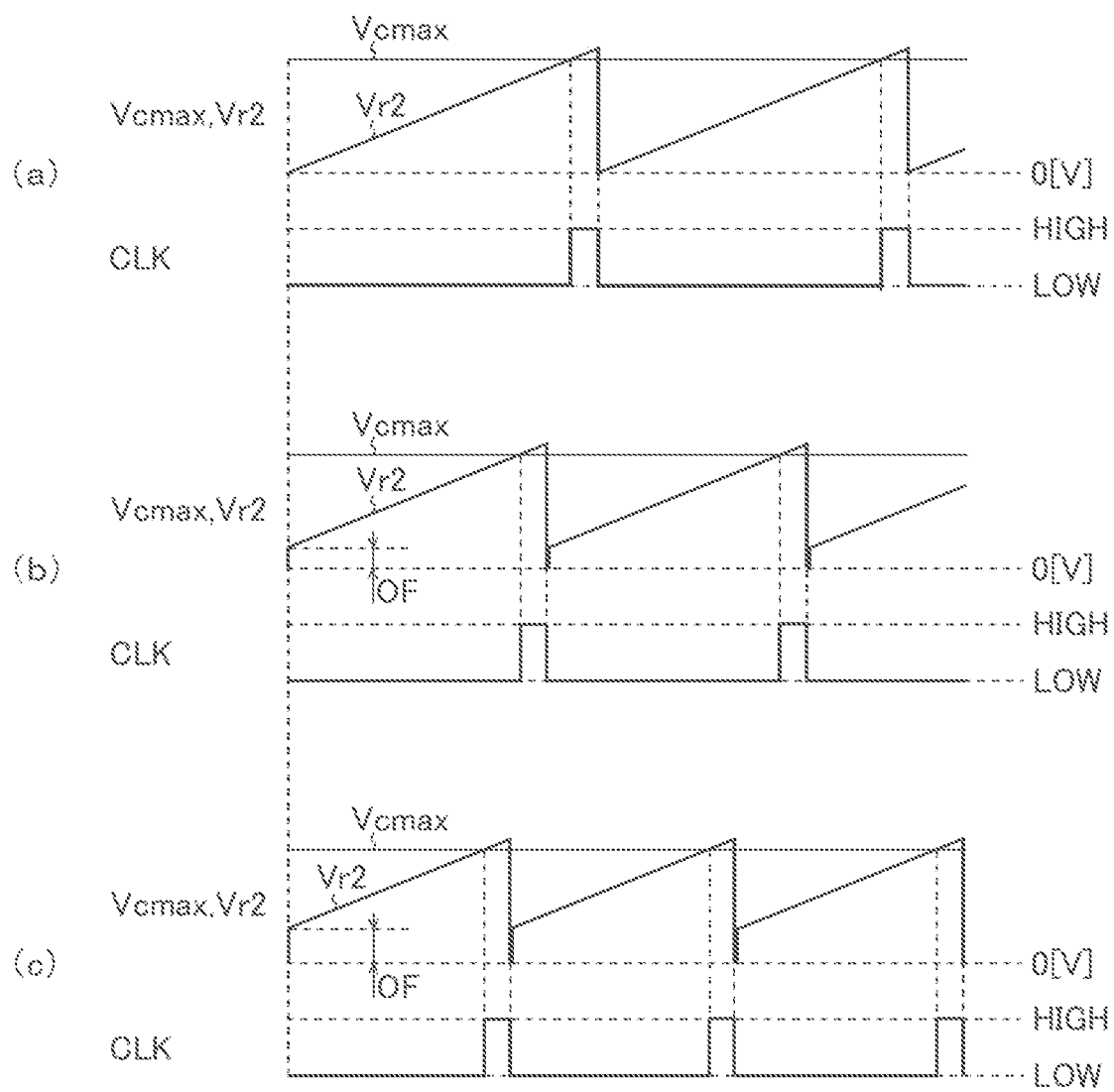
FIG. 3 A waveform diagrams of a constant voltage, a second ramp voltage, and a clock signal.

The oscillator 16 compares a constant voltage Vcmax with the second ramp voltage Vr2 to generate the clock signal CLK, which is a comparison signal, and outputs the generated clock signal CLK to the timing control circuit 17. Specifically, the oscillator 16 keeps the clock signal at low level during the period in which the second ramp voltage Vr2 is lower than the constant voltage Vcmax. and keeps the clock signal at high level during the period in which the second ramp voltage Vr2 is higher than the constant voltage Vcmax. The frequency of the clock signal CLK is modulated according to the offset modulation of the second ramp voltage Vr2. As shown at (a) to (c) in FIG. 3, the larger the offset OF of the second ramp voltage Vr2, the higher the frequency of the clock signal CLK. At (a) in FIG. 3, the offset OF of the second ramp voltage Vr2 equals zero.

The timing control circuit 17 switches the gate signal G from low level to high level when the set signal (the clock signal CLK output from the oscillator 16) switches from high level to low level, and switches the gate signal G1 from high level to low level when the reset signal RST switches from low level to high level.

The timing control circuit 17 has an intermittent operation mode and a non-intermittent operation mode (normal mode). The intermittent operation mode is a mode in which an operation period during which switching of the MOS transistors Q1 and Q2 is performed and a suspension period during which no switching of the MOS transistors Q1 and Q2 is performed. In the non-intermittent operation mode, the MOS transistors Q1 and Q2 keep being switched.

The timing control circuit 17 monitors the feedback voltage Vfb. When the feedback voltage Vfb is higher than a first threshold value, the timing control circuit 17 selects the intermittent operation mode, and when the feedback voltage Vfb is equal to or lower than the first threshold value, the timing control circuit 17 selects the non-intermittent operation mode. Thus, the switching power supply device shown in FIG. 1 operates in the intermittent operation mode under in a light load condition and operates in the non-intermittent operation mode in a non-light load condition.

In the intermittent operation mode, when the feedback voltage Vfb falls to or below a second threshold value, the timing control circuit 17 switches from the suspension period to the operation period. The second threshold value is larger than the first threshold value.

The timing control circuit 17 performs one of two types of control: control (first control) in which it switches from the operation period to the suspension period when the number of pulses in the gate signal G1 during the operation period becomes a constant value that is equal to or larger than two: and control (second control) in which it switches from the operation period to the suspension period when the feedback voltage Vfb becomes larger than a third threshold value. The third threshold value is larger than the second threshold value. When the timing control circuit 17 performs the second control, the number of pulses in the gate signal G during the operation period changes based on the feedback voltage Vfb, and hence based on the output voltage Vout of the switching power supply device shown in FIG. 1.

<3. Example of the Configuration of the Second Ramp Circuit>

Figure 4:
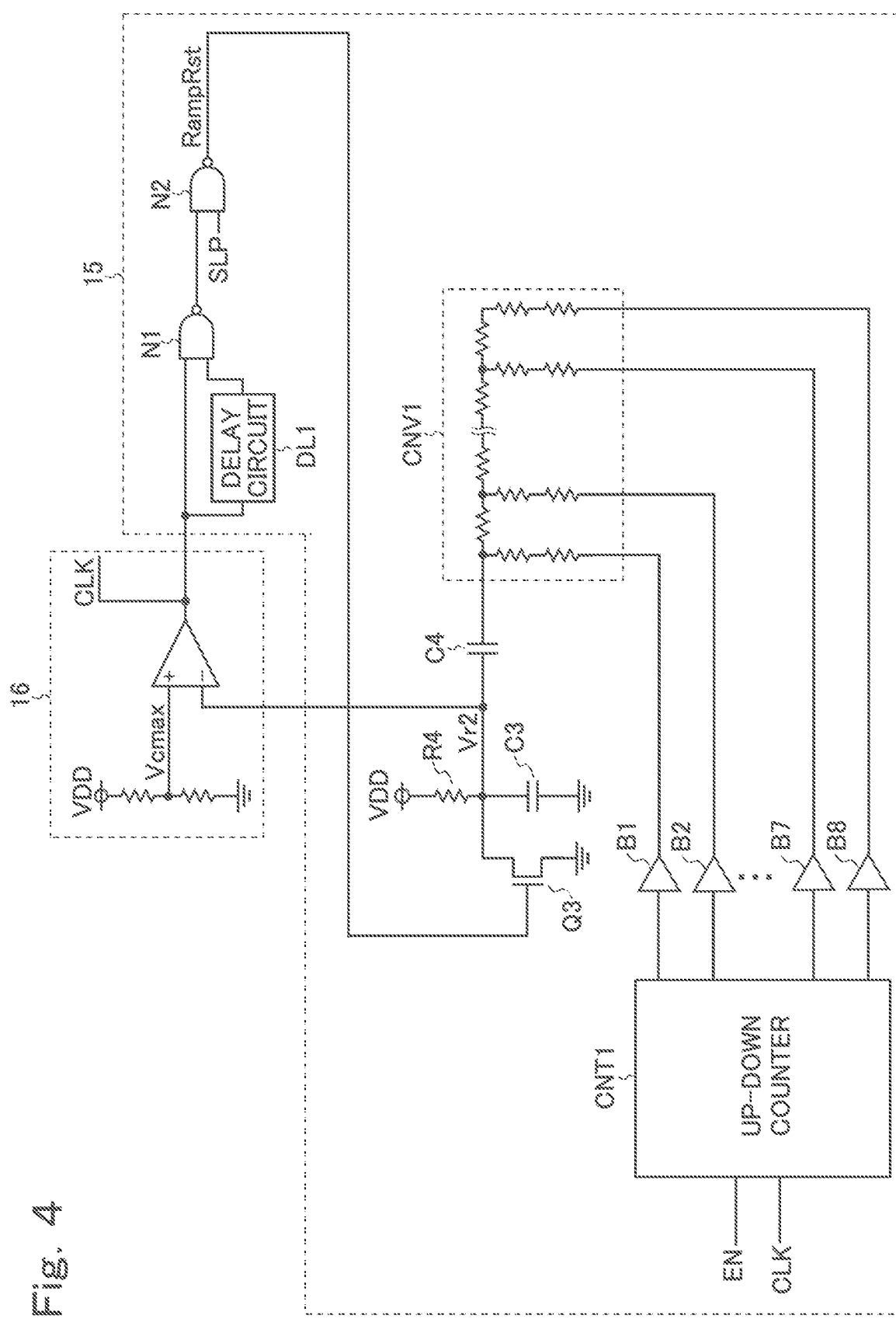
FIG. 4 A diagram showing one configuration example of the second ramp circuit and an oscillator.

FIG. 4 is a diagram showing one configuration example of the second ramp circuit 15 and the oscillator 16. In the example shown in FIG. 4, the second ramp circuit 15 includes an up-down counter CNT1, buffers B1 to B8, a D/A converter CNV1, capacitors C3 and C4, a resistor R4, a MOS transistor Q3, a delay circuit DL1, and NAND gates N1 and N2. The oscillator 16 is constituted by a voltage divider circuit which divides the internal supply voltage VDD to generate the constant voltage Vcmax and a comparator which compares the constant voltage Vcmax with the second ramp voltage Vr2 to generate the clock signal CLK, which is a comparison signal.

The up-down counter CNT1, in synchronism with the clock signal CLK, alternates up-counting from a first predetermined value to a second predetermined value and down-counting from the second predetermined value to the first predetermined value. The up-down counter CNT1 may perform counting every cycle of the clock signal CLK or every predetermined number of cycles of the clock signal CLK. In this embodiment, the up-down counter CNT1 is an 8-bit counter. The timing control circuit 17 controls the supply of the clock signal CLK from the oscillator 16 to the up-down counter CNT1. Specifically, control is performed such that, during the suspension period in the intermittent operation mode, the clock signal CLK is not fed to the up-down counter CNT1, and otherwise, the clock signal CLK is fed to the up-down counter CNT1.

When an enable signal EN fed to the up-down counter CNT1 is at high level, the up-down counter CNT1 is enabled, and spectrum spreading of the switching frequency is performed in the switching power supply device shown in FIG. 1. On the other hand, when the enable signal EN fed to the tip-down counter CNT1 is at low level, the up-down counter CNT1 is disabled, and no spectrum spreading of the switching frequency is performed in the switching power supply device shown in FIG. 1.

The output (count value) of the up-down counter CNT1 is fed to the D-A converter CNV1 via buffers B1 to B8. The D/A converter CNV1 converts the output (count value) of the up-down counter CNT1 to an analogue voltage.

With the capacitor C3, the resistor 4 is connected in series and the MOS transistor Q3 is connected in parallel. The MOS transistor Q3 is an N-channel MOS transistor. When the MOS transistor Q3 is off the capacitor C3 is charged by the current passing through the resistor R4 The charge current of the capacitor C3 is proportional to the internal supply voltage VDD. Thus, the gradient of the second ramp voltage Vr2, which is the voltage at the connection point between the resistor R4 and the capacitor C3, is proportional to the internal supply voltage VDD. When the MOS transistor Q3 is on, the capacitor C3 is discharged.

The output terminal of the D/A converter CNV1 is connected via the capacitor C4 to the connection point between the resistor R4 and the capacitor C3. Thus, the second ramp voltage Vr2, which is the voltage at the connection point between the resistor R4 and the capacitor C3, is given an offset by the analogue voltage output from the D/A converter CNV1.

The MOS transistor Q3 as a discharging switch is controlled by a ramp reset signal RampRst. Specifically, when, after the clock signal CLK switches from high level to low level a predetermined time (the delay time through the delay circuit DL1) has passed, the output signal of the NAND gate N1 turns to low level and the output signal of the NAND gate N2 (that is, the ramp reset signal RampRst) turns to high level; thus the MOS transistor Q3 turns on and the capacitor C3 is discharged. Also when a sleep signal SLP is at low level, the output signal of the NAND gate N2 (that is, the ramp reset signal RampRst) turns to high level: thus the MOS transistor Q3 turns on and the capacitor C3 is discharged. The sleep signal SLP is fed from the timing control circuit 17. The timing control circuit 17 keeps the sleep signal SLP at low level during the suspension period in the intermittent operation mode, and otherwise keeps the sleep signal SLP at high level.

Figure 5:
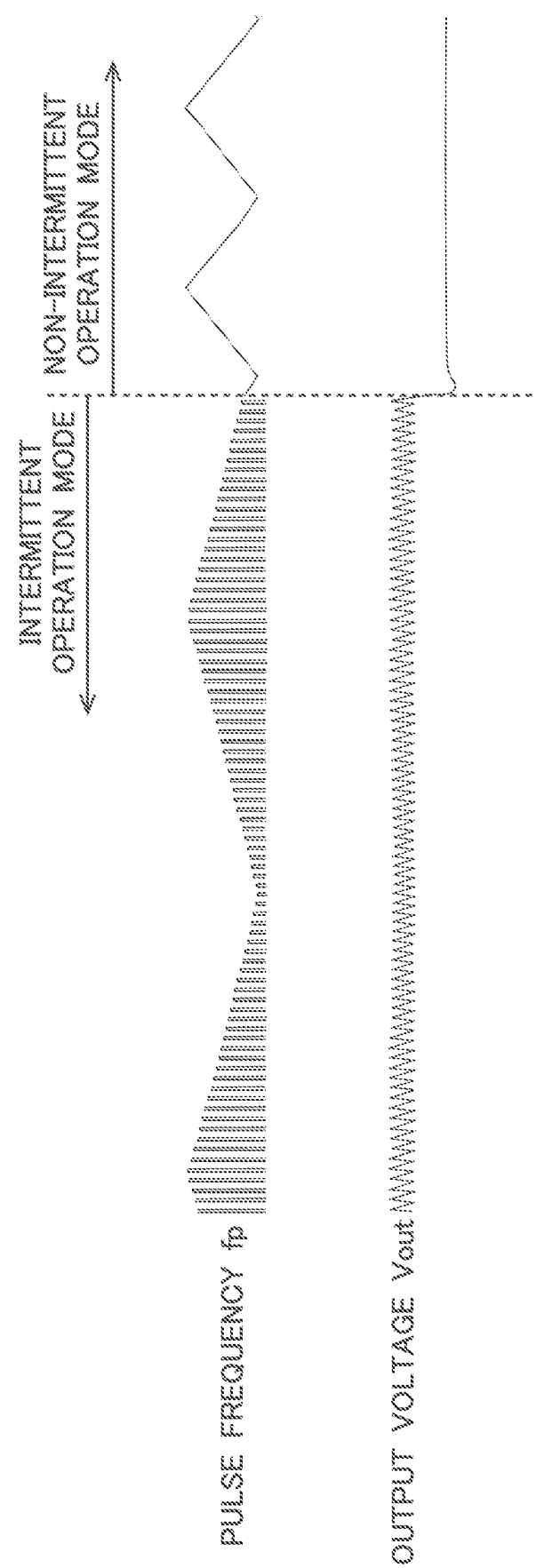
FIG. 5 A waveform diagram of a pulse frequency and an output voltage.

As described above, the second ramp circuit 15 shown in FIG. 4, during the operation period in the intermittent operation mode, and in the non-intermittent operation mode, modulates the offset of the second ramp voltage Vr2 in accordance with the output (count value) from the up-down counter CNT1. Thus, as shown in FIG. 5, during the operation period in the intermittent operation mode, and in the non-intermittent operation mode, the pulse frequency fp of the gate signals G1 and G2 is modulated. That is, the switching power supply device shown in FIG. 1 can perform spectrum spreading not only in the non-intermittent operation mode but also in the intermittent operation mode. Thus, the peak of the noise emitted from the switching power supply device shown in FIG. 1 is reduced not only in the non-intermittent operation mode but also in the intermittent operation mode.

Figure 6:
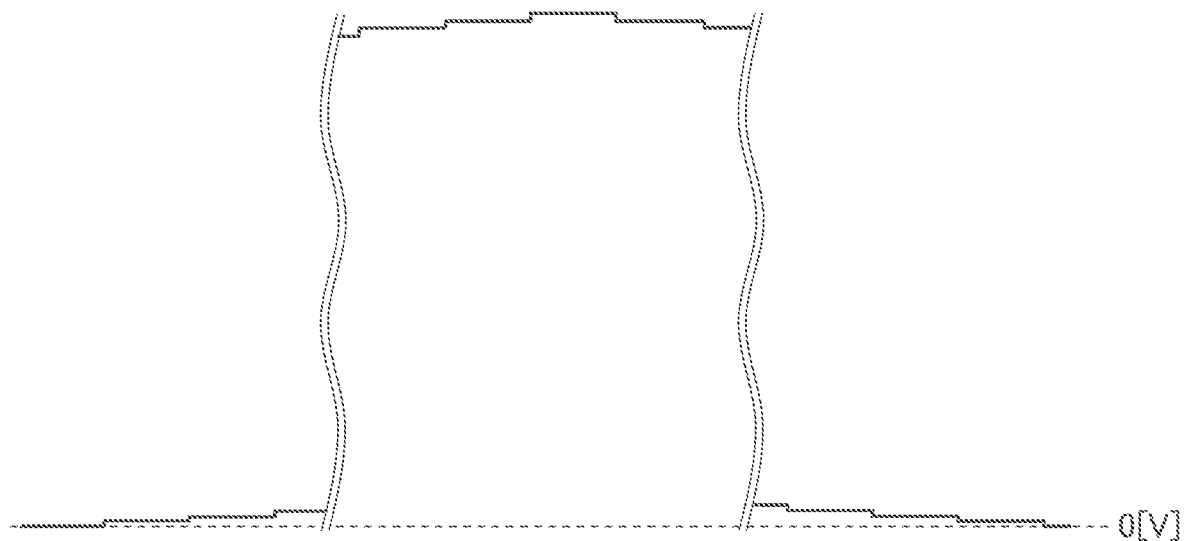
FIG. 6 A waveform diagram of an output signal of a D/A converter.

For example, the up-down counter CNT1 may be configured such that it holds the output (count value) during switching from the operation period to the suspension period in the intermittent operation mode. In this case, the analogue voltage which is output from the D/A converter CNV1 changes as shown in FIG. 6. Since the analogue voltage output from the D/A converter CNV1 is not 0 [V] during the suspension period, the D/A converter CNV1 consumes electric power during the suspension period.

Figure 7:
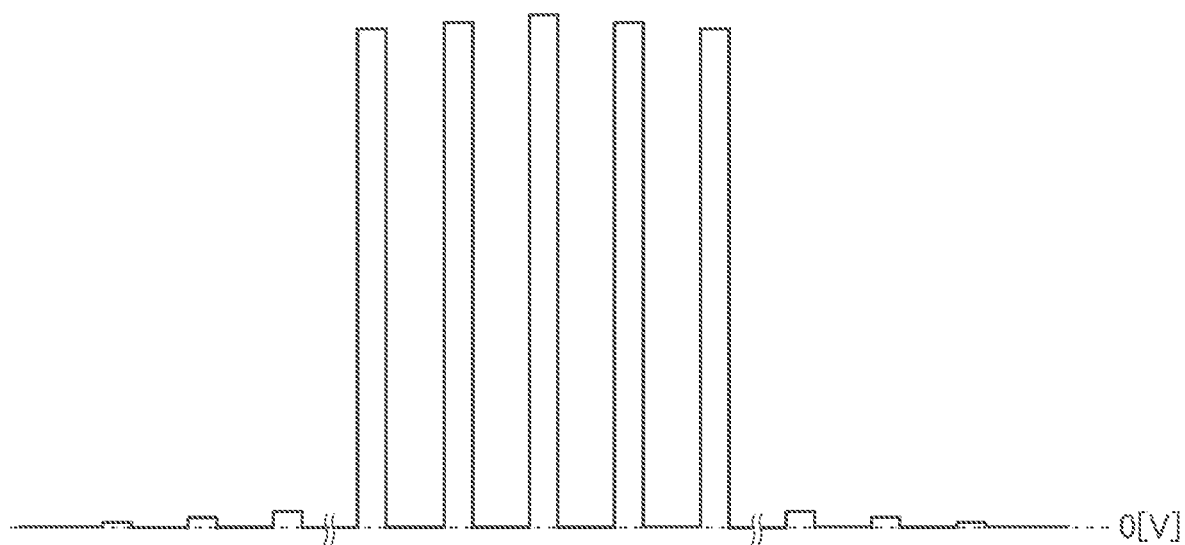
FIG. 7 Another waveform diagram of the output signal of the D/A converter.

For another example, a configuration is also possible where, during switching from the operation period to the suspension period in the intermittent operation mode, the tip-down counter CNT1 makes all bits of the output (count value) equal to the round potential, and then, during switching from the suspension period to the operation period, restores the output (count value) in the previous operation period, or makes the output (count value) equal to a value counted up or down from the output (count value) in the previous operation period. In this case, the analogue voltage which is output from the D/A converter CNV1 changes as shown in FIG. 7. Since the analogue voltage output from the D/A converter CNV1 is 0 [V] during the suspension period, the D/A converter CNV1 does not consume electric power during the suspension period. Thus, it is possible to further improve efficiency in the intermittent operation mode.

<Applications>

Figure 8:
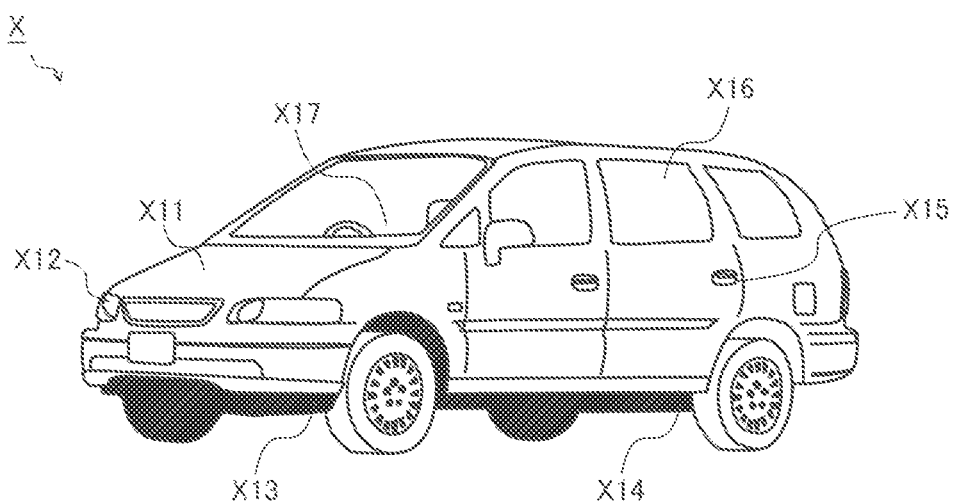
FIG. 8 An exterior view of a vehicle.

Next, an example of application of the switching power supply device shown in FIG. 1 will be described. FIG. 8 is an exterior view showing an exemplary configuration of a vehicle incorporating vehicle-mounted appliances. The vehicle X of this configuration example incorporates a battery (unillustrated in FIG. 8), the switching power supply device shown in FIG. 1 (unillustrated in FIG. 8), and vehicle-mounted appliances X11 to X17.

When the switching power supply device shown in FIG. 1 is incorporated in a vehicle X, it is necessary to reduce emission noise in the AM band so as to prevent an adverse effect on the reception of AM radio broadcast. Thus, it is preferable that the switching control circuit 1 control the switching frequency of the MOS transistors Q and Q2 in the non-intermittent operation mode such that it remains at 1.8 MHz or higher but 2.1 MHz or lower. This is because a switching frequency lower than 1.8 MHz leads to increased radiation noise in the AM band and a switching frequency larger than 2.1 MHz leads to a switching loss exceeding the permissible range.

For example, by setting the frequency of the clock signal CLK output from the oscillator 16 at 1.8 MHz or higher but 2.1 MHz or lower, the switching control circuit 1 can control the switching frequency of the MOS transistors Q1 and Q2 in the non-intermittent operation mode such that it remains at 1.8 MHz or higher but 2.1 MHz or lower.

Figure 9:
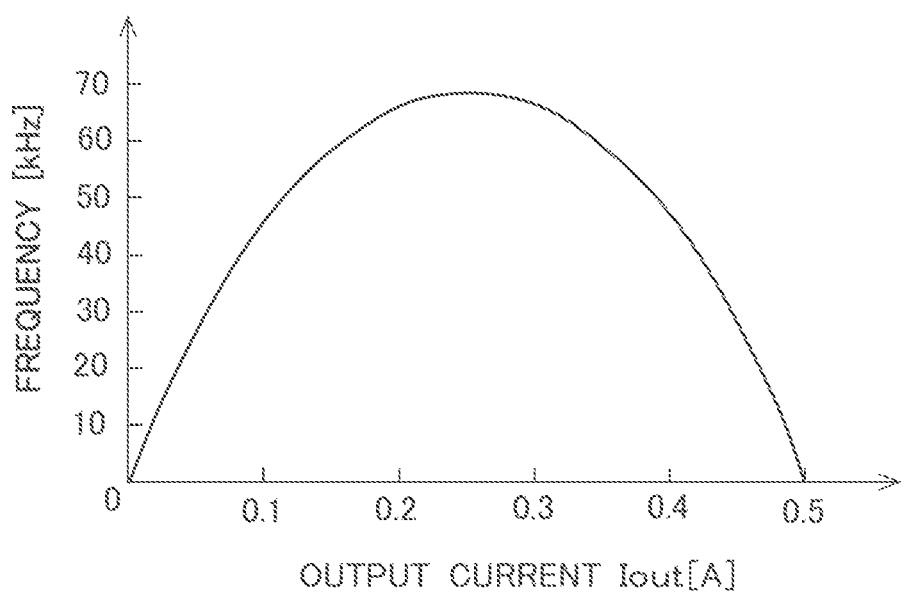
FIG. 9 A diagram showing noise frequency characteristics in an intermittent operation mode.

When the timing control circuit 17 described above performs the second control, the noise frequency characteristics in the intermittent operation mode is as shown in FIG. 9. That is, in the intermittent operation mode, as the load of the switching power supply device shown in FIG. 1 is increased, the frequency of the emission noise from the switching power supply device shown in FIG. 1 increases from a low range up to 70 kHz, and then decreases. That is, no emission noise in the AM band is generated.

The switching power supply device shown in FIG. 1 is fed with a direct-current voltage from a battery to generate the output voltage and feeds the output voltage to at least one of the vehicle-mounted appliances X11 to X17.

The vehicle-mounted appliance X11 is an engine control unit which performs control related to the engine (such as the control of injection, electronic throttling, idling, an oxygen sensor heater, and automatic cruising).

The vehicle-mounted appliance X12 is a lamp control unit that controls turning on/off of HIDs (high-intensity discharge lamps) and DRLs (daytime running lamps).

The vehicle-mounted appliance X13 is a transmission control unit which performs control related to transmission.

The vehicle-mounted appliance X14 is a body control unit which performs control related to the movement of the vehicle X (such as the control of an ABS (anti-lock braking system), EPS (electric power steering), and electronic suspension).

The vehicle-mounted appliance X15 is a security control unit which controls the driving of door locks, burglar alarms, and the like.

The vehicle-mounted appliance X16 comprises electronic appliances incorporated in the vehicle X as standard or manufacturer-fitted equipment at the stage of factory shipment, such as wipers, power side mirrors, power windows, a power sun roof, power seats, and an air conditioner.

The vehicle-mounted appliance X17 comprises electronic appliances fitted to the vehicle X optionally as user-fitted equipment, such as vehicle mounted AV (audio-visual) equipment, a car navigation system, and an ETC (electronic toll collection system).

<Notes>

The embodiment described above is in no way meant to limit the present disclosure, which thus allows for many modifications and variations within the spirit of the present disclosure. It should be understood that the embodiment described above is in every aspect illustrative and not restrictive, and that the technical scope of the present invention is defined not by the above description of the embodiments but by the appended claims and encompasses any modifications within a sense and scope equivalent to those of the claims.

For example, although the above embodiment deals with an example where the switching control circuit is used in a bucking switching regulator, it may be used in any switching power supply devices other than a bucking switching regulator.

For another example, although the above embodiment is configured such that the second ramp circuit 15 includes an up-down counter CNT1, an up counter or a down counter may be used instead of the up-down counter CNT1. However, with an up counter, the count value returns to a minimum value when the count value reaches a maximum value and the count value then changes greatly; with a down counter, the count value returns to a maximum value when the count value reaches a minimum value and the count value then changes greatly. On the other hand, with an up-down counter, it is possible to avoid a large change in the count value, and this makes it preferable to an up counter or a down counter.

LIST OF REFERENCE SIGNS 1 switching control circuit
11 error amplifier
12 reference voltage source
13 first ramp circuit
14 comparator
15 second ramp circuit
16 oscillator
17 timing control circuit
B1 to B8 buffer
C1 output capacitor
C2 to C4 capacitor
CNT1 up-down counter
CNV1 D/A converter
DL1 delay circuit
L1 inductor
N1, N2 NAND gate
Q1 to Q3 MOS transistor
R1, R2 voltage division resistor
R3, R4 resistor X vehicle X11 to X17 vehicle-mounted appliance

The invention claimed is:

1. A switching control circuit used in a switching power supply device for generating an output voltage from an input voltage, the switching control circuit being configured to have an intermittent operation mode in which an operation period during which switching of an output switching element in the switching power supply device is performed and a suspension period during which no switching of the output switching element is performed alternate, the switching control circuit comprising:
   a modulator configured to modulate a pulse frequency of a switching control signal during the operation period,
   wherein the switching control circuit is configured to control switching of the output switching element with the switching control signal during the operation period,
   the modulator includes:
      a counter, and
      a D/A converter configured to perform digital-to-analog conversion on an output of the counter,
   wherein the modulator is configured to modulate the pulse frequency according to an output of the D/A converter, and no clock signal is fed to the counter during the suspension period.

2. The switching control circuit according to claim 1, wherein the counter is an up-down counter.

3. The switching control circuit according to claim 1, wherein the output of the D/A converter is kept at a ground potential during the suspension period.

4. The switching control circuit according to claim 1, wherein the number of pulses in the switching control signal during the operation period is a constant value equal to or larger than two.

5. The switching control circuit according to claim 1, wherein the number of pulses in the switching control signal during the operation period changes based on the output voltage.

6. The switching control circuit according to claim 1, configured to further have a non-intermittent operation mode in which the output switching element keeps being switched,
   wherein the switching control circuit is configured to control, with the switching control signal, a switching frequency of the output switching element such that the switching frequency remains at 1.8 MHz or higher but 2.1 MHz or lower during the non-intermittent operation mode.

7. A switching power supply device comprising:
   an output switching element; and
   the switching control circuit according to claim 1 which controls switching of the output switching element.

8. A vehicle comprising:
   the switching power supply device according to claim 7; and
   a battery for supplying the switching power supply device with electric power.

* * * * *